(12) United States Patent
Lavoie et al.

(10) Patent No.: US 9,352,777 B2
(45) Date of Patent: May 31, 2016

(54) METHODS AND SYSTEMS FOR CONFIGURING OF A TRAILER MANEUVERING SYSTEM

(71) Applicant: Ford Global Technologies, LLC, Dearborn, MI (US)

(72) Inventors: Erick Michael Lavoie, Dearborn, MI (US); Bruce Frederick Pierce, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/477,944

(22) Filed: Sep. 5, 2014

(65) Prior Publication Data

US 2015/0120141 A1    Apr. 30, 2015

Related U.S. Application Data

(63) Continuation-in-part of application No. 14/290,243, filed on May 29, 2014, which is a continuation-in-part of application No. 14/249,781, filed on Apr. 10, 2014, which is a continuation-in-part of application No. 14/201,130, filed on Mar. 7, 2014, which is a continuation-in-part of application No. 14/068,387, filed on Oct. 31, 2013, now Pat. No. 9,102,271.

(51) Int. Cl.
| | |
|---|---|
| *G06F 19/00* | (2011.01) |
| *B62D 13/06* | (2006.01) |
| *B62D 15/02* | (2006.01) |
| *B60W 30/00* | (2006.01) |

(Continued)

(52) U.S. Cl.
CPC ............... *B62D 13/06* (2013.01); *B60W 30/00* (2013.01); *B62D 15/027* (2013.01); *H04N 7/183* (2013.01); *G01B 21/02* (2013.01)

(58) Field of Classification Search
None
See application file for complete search history.

(56) References Cited

U.S. PATENT DOCUMENTS

| 3,605,088 A | 9/1971 | Savelli |
| 3,833,928 A | 9/1974 | Gavit et al. |
| 3,924,257 A | 12/1975 | Roberts |

(Continued)

FOREIGN PATENT DOCUMENTS

| CN | 101610420 A | 12/2009 |
| CN | 101833869 A | 9/2010 |

(Continued)

OTHER PUBLICATIONS

Skybitz, website, 2012, pp. 1-3, http://www.skybitz.com/products-services/hardware/bat-xtndr/.

(Continued)

*Primary Examiner* — James Trammell
*Assistant Examiner* — Demetra Smith-Stewart
(74) *Attorney, Agent, or Firm* — Raymond Coppiellie; Price Heneveld LLP

(57) ABSTRACT

A system for configuring a trailer model for a trailer maneuvering system is disclosed. The system comprises a controller having a memory and being operable to communicate with the trailer maneuvering system. The controller is configured to receive trailer dimensional data from a mobile device. The trailer dimensional data may then be stored in the memory as a first trailer profile. The controller is operable to access the trailer dimensional data in the first trailer profile to determine at least one vehicle operation configured to maneuver the trailer.

20 Claims, 6 Drawing Sheets

(51) Int. Cl.
*H04N 7/18* (2006.01)
*G01B 21/02* (2006.01)

(56) References Cited

U.S. PATENT DOCUMENTS

| | | |
|---|---|---|
| 4,044,706 A | 8/1977 | Gill |
| 4,430,637 A | 2/1984 | Koch-Ducker et al. |
| 4,846,094 A | 7/1989 | Woods |
| 4,848,499 A | 7/1989 | Martinet et al. |
| 4,897,642 A | 1/1990 | DiLullo et al. |
| 4,947,097 A | 8/1990 | Tao |
| 5,097,250 A | 3/1992 | Hernandez |
| 5,142,278 A | 8/1992 | Moallemi et al. |
| 5,191,328 A | 3/1993 | Nelson |
| 5,235,316 A | 8/1993 | Qualizza |
| 5,247,442 A | 9/1993 | Kendall |
| 5,282,641 A | 2/1994 | McLaughlin |
| 5,442,810 A | 8/1995 | Jenquin |
| 5,455,557 A | 10/1995 | Noll et al. |
| 5,461,357 A | 10/1995 | Yoshioka et al. |
| 5,650,764 A | 7/1997 | McCullough |
| 5,690,347 A | 11/1997 | Juergens et al. |
| 5,734,336 A | 3/1998 | Smithline |
| 5,905,433 A | 5/1999 | Wortham |
| 5,951,035 A | 9/1999 | Phillips, Jr. et al. |
| 5,957,232 A | 9/1999 | Shimizu et al. |
| 5,999,091 A | 12/1999 | Wortham |
| 6,100,795 A | 8/2000 | Otterbacher et al. |
| 6,111,524 A | 8/2000 | Lesesky et al. |
| 6,142,372 A | 11/2000 | Wright |
| 6,178,650 B1 | 1/2001 | Thibodeaux |
| 6,182,010 B1 | 1/2001 | Berstis |
| 6,198,992 B1 | 3/2001 | Winslow |
| 6,226,226 B1 | 5/2001 | Lill et al. |
| 6,366,202 B1 | 4/2002 | Rosenthal |
| 6,411,898 B2 | 6/2002 | Ishida et al. |
| 6,434,486 B1 | 8/2002 | Studt et al. |
| 6,480,104 B1 | 11/2002 | Wall et al. |
| 6,483,429 B1 | 11/2002 | Yasui et al. |
| 6,501,376 B2 | 12/2002 | Dieckmann et al. |
| 6,526,335 B1 | 2/2003 | Treyz et al. |
| 6,573,833 B1 | 6/2003 | Rosenthal |
| 6,577,952 B2 | 6/2003 | Geier et al. |
| 6,580,984 B2 | 6/2003 | Fecher et al. |
| 6,604,592 B2 | 8/2003 | Pietsch et al. |
| 6,643,576 B1 | 11/2003 | O Connor et al. |
| 6,683,539 B2 | 1/2004 | Trajkovic et al. |
| 6,687,609 B2 | 2/2004 | Hsiao et al. |
| 6,801,125 B1 | 10/2004 | McGregor et al. |
| 6,816,765 B2 | 11/2004 | Yamamoto et al. |
| 6,837,432 B2 | 1/2005 | Tsikos et al. |
| 6,847,916 B1 | 1/2005 | Ying |
| 6,933,837 B2 | 8/2005 | Gunderson et al. |
| 6,959,970 B2 | 11/2005 | Tseng |
| 6,970,184 B2 | 11/2005 | Hirama et al. |
| 6,989,739 B2 | 1/2006 | Li |
| 7,026,957 B2 | 4/2006 | Rubenstein |
| 7,047,117 B2 | 5/2006 | Akiyama et al. |
| 7,085,634 B2 | 8/2006 | Endo et al. |
| 7,089,101 B2 | 8/2006 | Fischer et al. |
| 7,136,754 B2 | 11/2006 | Hahn et al. |
| 7,142,098 B2 | 11/2006 | Lang et al. |
| 7,154,385 B2 | 12/2006 | Lee et al. |
| 7,175,194 B2 | 2/2007 | Ball |
| 7,204,504 B2 | 4/2007 | Gehring et al. |
| 7,207,041 B2 | 4/2007 | Elson et al. |
| 7,220,217 B2 | 5/2007 | Tamai et al. |
| 7,225,891 B2 | 6/2007 | Gehring et al. |
| 7,229,139 B2 | 6/2007 | Lu et al. |
| 7,239,958 B2 | 7/2007 | Grougan et al. |
| 7,266,435 B2 | 9/2007 | Wang et al. |
| 7,309,075 B2 | 12/2007 | Ramsey et al. |
| 7,310,084 B2 | 12/2007 | Shitanaka et al. |
| 7,315,299 B2 | 1/2008 | Sunda et al. |
| 7,319,927 B1 | 1/2008 | Sun et al. |
| 7,353,110 B2 | 4/2008 | Kim |
| 7,366,892 B2 | 4/2008 | Spaur et al. |
| 7,401,871 B2 | 7/2008 | Lu et al. |
| 7,425,889 B2 | 9/2008 | Widmann et al. |
| 7,447,585 B2 * | 11/2008 | Tandy et al. ............... 701/70 |
| 7,451,020 B2 | 11/2008 | Goetting et al. |
| 7,463,137 B2 | 12/2008 | Wishart et al. |
| 7,505,784 B2 | 3/2009 | Barbera |
| 7,537,256 B2 | 5/2009 | Gates et al. |
| 7,552,009 B2 | 6/2009 | Nelson |
| 7,602,782 B2 | 10/2009 | Doviak et al. |
| 7,623,952 B2 | 11/2009 | Unruh et al. |
| 7,640,180 B1 | 12/2009 | Slocum et al. |
| 7,689,253 B2 | 3/2010 | Basir |
| 7,690,737 B2 | 4/2010 | Lu |
| 7,692,557 B2 | 4/2010 | Medina et al. |
| 7,693,661 B2 | 4/2010 | Iwasaka |
| 7,715,953 B2 | 5/2010 | Shepard |
| 7,731,302 B2 * | 6/2010 | Tandy et al. ............... 303/7 |
| 7,760,077 B2 | 7/2010 | Day |
| 7,777,615 B2 | 8/2010 | Okuda et al. |
| 7,783,699 B2 | 8/2010 | Rasin et al. |
| 7,786,849 B2 | 8/2010 | Buckley |
| 7,801,941 B2 | 9/2010 | Conneely et al. |
| 7,825,782 B2 | 11/2010 | Hermann |
| 7,827,047 B2 | 11/2010 | Anderson et al. |
| 7,904,222 B2 | 3/2011 | Lee et al. |
| 7,907,975 B2 | 3/2011 | Sakamoto et al. |
| 7,917,081 B2 | 3/2011 | Voto et al. |
| 7,932,623 B2 | 4/2011 | Burlak et al. |
| 7,932,815 B2 | 4/2011 | Martinez et al. |
| 7,950,751 B2 | 5/2011 | Offerle et al. |
| 7,969,326 B2 | 6/2011 | Sakakibara |
| 8,009,025 B2 | 8/2011 | Engstrom et al. |
| 8,010,252 B2 | 8/2011 | Getman et al. |
| 8,019,592 B2 | 9/2011 | Fukuoka et al. |
| 8,024,743 B2 | 9/2011 | Werner |
| 8,033,955 B2 | 10/2011 | FarNsworth |
| 8,036,792 B2 | 10/2011 | Dechamp |
| 8,037,500 B2 | 10/2011 | Margis et al. |
| 8,038,166 B1 | 10/2011 | Piesinger |
| 8,044,776 B2 | 10/2011 | Schofield et al. |
| 8,044,779 B2 | 10/2011 | Hahn et al. |
| 8,068,019 B2 * | 11/2011 | Bennie et al. ............... 340/442 |
| 8,121,802 B2 | 2/2012 | Grider et al. |
| 8,131,458 B1 | 3/2012 | Zilka |
| 8,140,138 B2 | 3/2012 | Chrumka |
| 8,150,474 B2 | 4/2012 | Saito et al. |
| 8,165,770 B2 | 4/2012 | Getman et al. |
| 8,169,341 B2 | 5/2012 | Toledo et al. |
| 8,174,576 B2 | 5/2012 | Akatsuka et al. |
| 8,179,238 B2 | 5/2012 | Roberts, Sr. et al. |
| 8,195,145 B2 | 6/2012 | Angelhag |
| 8,205,704 B2 | 6/2012 | Kadowaki et al. |
| 8,223,204 B2 | 7/2012 | Hahn |
| 8,244,442 B2 | 8/2012 | Craig et al. |
| 8,245,270 B2 | 8/2012 | Cooperstein et al. |
| 8,255,007 B2 | 8/2012 | Saito et al. |
| 8,267,485 B2 | 9/2012 | Barlsen et al. |
| 8,270,933 B2 | 9/2012 | Riemer et al. |
| 8,280,607 B2 | 10/2012 | Gatti et al. |
| 8,308,182 B2 | 11/2012 | Ortmann et al. |
| 8,310,353 B2 | 11/2012 | Hinninger et al. |
| 8,315,617 B2 | 11/2012 | Tadayon et al. |
| 8,319,663 B2 | 11/2012 | Von Reyher et al. |
| 8,352,575 B2 | 1/2013 | Samaha |
| 8,362,888 B2 | 1/2013 | Roberts, Sr. et al. |
| 8,370,056 B2 | 2/2013 | Trombley et al. |
| 8,374,749 B2 | 2/2013 | Tanaka |
| 8,380,416 B2 | 2/2013 | Offerle et al. |
| 8,392,066 B2 | 3/2013 | Ehara et al. |
| 8,401,744 B2 | 3/2013 | Chiocco |
| 8,406,956 B2 | 3/2013 | Wey et al. |
| 8,417,263 B2 | 4/2013 | Jenkins et al. |
| 8,417,417 B2 | 4/2013 | Chen et al. |
| 8,451,107 B2 | 5/2013 | Lu et al. |
| 8,471,691 B2 | 6/2013 | Zhang et al. |
| 8,473,575 B2 | 6/2013 | Marchwicki et al. |
| 8,494,439 B2 | 7/2013 | Faenger |

(56) References Cited

U.S. PATENT DOCUMENTS

| | | |
|---|---|---|
| 8,498,757 B2 | 7/2013 | Bowden et al. |
| 8,560,175 B2 | 10/2013 | Bammert et al. |
| 8,571,758 B2 | 10/2013 | Klier et al. |
| 8,626,382 B2 | 1/2014 | Obradovich |
| 8,755,984 B2 | 6/2014 | Rupp et al. |
| 8,786,417 B2 | 7/2014 | Holmen et al. |
| 8,888,120 B2 * | 11/2014 | Trevino ............... 280/477 |
| 8,930,140 B2 | 1/2015 | Trombley et al. |
| 2002/0005780 A1 | 1/2002 | Ehrlich et al. |
| 2002/0098853 A1 | 7/2002 | Chrumka |
| 2003/0079123 A1 | 4/2003 | Mas Ribes |
| 2003/0147534 A1 | 8/2003 | Ablay et al. |
| 2003/0222982 A1 | 12/2003 | Hamdan et al. |
| 2003/0234512 A1 | 12/2003 | Holub |
| 2004/0119822 A1 | 6/2004 | Custer et al. |
| 2004/0203660 A1 | 10/2004 | Tibrewal et al. |
| 2004/0207525 A1 | 10/2004 | Wholey et al. |
| 2004/0260438 A1 | 12/2004 | Chernetsky et al. |
| 2005/0000738 A1 | 1/2005 | Gehring et al. |
| 2005/0071373 A1 | 3/2005 | Long |
| 2005/0073433 A1 | 4/2005 | Gunderson et al. |
| 2005/0074143 A1 | 4/2005 | Kawai |
| 2005/0091408 A1 | 4/2005 | Parupudi et al. |
| 2005/0128059 A1 | 6/2005 | Vause |
| 2005/0146607 A1 | 7/2005 | Linn et al. |
| 2005/0168331 A1 | 8/2005 | Gunderson |
| 2005/0177635 A1 | 8/2005 | Schmidt et al. |
| 2005/0206225 A1 | 9/2005 | Offerle et al. |
| 2005/0206299 A1 | 9/2005 | Nakamura et al. |
| 2005/0236201 A1 | 10/2005 | Spannheimer et al. |
| 2005/0236896 A1 | 10/2005 | Offerle et al. |
| 2006/0071447 A1 | 4/2006 | Gehring et al. |
| 2006/0076828 A1 | 4/2006 | Lu et al. |
| 2006/0092129 A1 | 5/2006 | Choquet et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0156315 A1 | 7/2006 | Wood et al. |
| 2006/0190097 A1 | 8/2006 | Rubenstein |
| 2006/0250501 A1 | 11/2006 | Widmann et al. |
| 2006/0287821 A1 | 12/2006 | Lin |
| 2007/0027581 A1 | 2/2007 | Bauer et al. |
| 2007/0058273 A1 | 3/2007 | Ito et al. |
| 2007/0132560 A1 | 6/2007 | Nystrom et al. |
| 2007/0132573 A1 | 6/2007 | Quach et al. |
| 2007/0198190 A1 | 8/2007 | Bauer et al. |
| 2007/0216136 A1 | 9/2007 | Dietz |
| 2007/0271267 A1 | 11/2007 | Lim et al. |
| 2008/0148374 A1 | 6/2008 | Spaur et al. |
| 2008/0177443 A1 | 7/2008 | Lee et al. |
| 2008/0180526 A1 | 7/2008 | Trevino |
| 2008/0231701 A1 | 9/2008 | Greenwood et al. |
| 2008/0312792 A1 | 12/2008 | Dechamp |
| 2008/0313050 A1 | 12/2008 | Basir |
| 2009/0005932 A1 | 1/2009 | Lee et al. |
| 2009/0045924 A1 | 2/2009 | Roberts, Sr. et al. |
| 2009/0063053 A1 | 3/2009 | Basson et al. |
| 2009/0075624 A1 | 3/2009 | Cox et al. |
| 2009/0082935 A1 | 3/2009 | Leschuk et al. |
| 2009/0093928 A1 | 4/2009 | Getman et al. |
| 2009/0106036 A1 | 4/2009 | Tamura et al. |
| 2009/0117890 A1 | 5/2009 | Jacobsen et al. |
| 2009/0140064 A1 | 6/2009 | Schultz et al. |
| 2009/0253466 A1 | 10/2009 | Saito et al. |
| 2009/0271078 A1 | 10/2009 | Dickinson |
| 2009/0306854 A1 | 12/2009 | Dechamp |
| 2009/0318119 A1 | 12/2009 | Basir et al. |
| 2010/0060739 A1 | 3/2010 | Salazar |
| 2010/0063670 A1 | 3/2010 | Brzezinski et al. |
| 2010/0098853 A1 | 4/2010 | Hoffmann et al. |
| 2010/0152989 A1 | 6/2010 | Smith et al. |
| 2010/0156667 A1 | 6/2010 | Bennie et al. |
| 2010/0156671 A1 | 6/2010 | Lee et al. |
| 2010/0157061 A1 | 6/2010 | Katsman et al. |
| 2010/0171828 A1 | 7/2010 | Ishii |
| 2010/0191421 A1 | 7/2010 | Nilsson |
| 2010/0198491 A1 | 8/2010 | Mays |
| 2010/0222964 A1 | 9/2010 | Dechamp |
| 2010/0234071 A1 | 9/2010 | Shabtay et al. |
| 2010/0305815 A1 | 12/2010 | Trueman et al. |
| 2010/0306309 A1 | 12/2010 | Santori et al. |
| 2010/0324770 A1 | 12/2010 | Ramsey et al. |
| 2011/0001825 A1 | 1/2011 | Hahn |
| 2011/0022282 A1 | 1/2011 | Wu et al. |
| 2011/0025482 A1 | 2/2011 | Alguera et al. |
| 2011/0063425 A1 | 3/2011 | Tieman |
| 2011/0088659 A1 | 4/2011 | Wang et al. |
| 2011/0110530 A1 | 5/2011 | Kimura |
| 2011/0112762 A1 | 5/2011 | Gruijters et al. |
| 2011/0125457 A1 | 5/2011 | Lee et al. |
| 2011/0129093 A1 | 6/2011 | Karam et al. |
| 2011/0140872 A1 | 6/2011 | McClure |
| 2011/0149077 A1 | 6/2011 | Robert |
| 2011/0153198 A1 | 6/2011 | Kokkas et al. |
| 2011/0160956 A1 | 6/2011 | Chung et al. |
| 2011/0181457 A1 | 7/2011 | Basten |
| 2011/0185390 A1 | 7/2011 | Faenger et al. |
| 2011/0195659 A1 | 8/2011 | Boll et al. |
| 2011/0216199 A1 | 9/2011 | Trevino et al. |
| 2011/0257860 A1 | 10/2011 | Getman et al. |
| 2011/0281522 A1 | 11/2011 | Suda |
| 2011/0296037 A1 | 12/2011 | Westra et al. |
| 2012/0004805 A1 | 1/2012 | Gray et al. |
| 2012/0062743 A1 | 3/2012 | Lynam et al. |
| 2012/0062744 A1 | 3/2012 | Schofield et al. |
| 2012/0065815 A1 | 3/2012 | Hess |
| 2012/0079002 A1 | 3/2012 | Boll et al. |
| 2012/0084292 A1 | 4/2012 | Liang et al. |
| 2012/0086808 A1 | 4/2012 | Lynam et al. |
| 2012/0095649 A1 | 4/2012 | Klier et al. |
| 2012/0185131 A1 | 7/2012 | Headley |
| 2012/0191285 A1 | 7/2012 | Woolf et al. |
| 2012/0200706 A1 | 8/2012 | Greenwood et al. |
| 2012/0265416 A1 | 10/2012 | Lu et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0283909 A1 | 11/2012 | Dix |
| 2012/0283910 A1 | 11/2012 | Lee et al. |
| 2012/0288156 A1 | 11/2012 | Kido |
| 2012/0316732 A1 | 12/2012 | Auer |
| 2013/0006472 A1 | 1/2013 | McClain et al. |
| 2013/0024064 A1 | 1/2013 | Shepard |
| 2013/0027195 A1 | 1/2013 | Van Wiemeersch et al. |
| 2013/0038436 A1 | 2/2013 | Brey et al. |
| 2013/0041524 A1 | 2/2013 | Brey |
| 2013/0057397 A1 | 3/2013 | Cutler et al. |
| 2013/0076007 A1 | 3/2013 | Goode et al. |
| 2013/0148748 A1 | 6/2013 | Suda |
| 2013/0158803 A1 | 6/2013 | Headley |
| 2013/0158863 A1 | 6/2013 | Skvarce et al. |
| 2013/0226390 A1 | 8/2013 | Luo et al. |
| 2013/0253814 A1 | 9/2013 | Wirthlin |
| 2013/0261843 A1 | 10/2013 | Kossira et al. |
| 2013/0268160 A1 | 10/2013 | Trombley et al. |
| 2014/0005918 A1 | 1/2014 | Qiang |
| 2014/0012465 A1 | 1/2014 | Shank et al. |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058655 A1 | 2/2014 | Trombley et al. |
| 2014/0085472 A1 | 3/2014 | Lu et al. |
| 2014/0088797 A1 | 3/2014 | McClain et al. |
| 2014/0121930 A1 | 5/2014 | Allexi et al. |
| 2014/0156148 A1 | 6/2014 | Kikuchi |
| 2014/0172232 A1 | 6/2014 | Rupp et al. |
| 2014/0188344 A1 | 7/2014 | Lavoie |
| 2014/0188346 A1 | 7/2014 | Lavoie |
| 2014/0222288 A1 | 8/2014 | Lavoie et al. |
| 2014/0277942 A1 | 9/2014 | Kyrtsos et al. |
| 2014/0297129 A1 | 10/2014 | Lavoie et al. |
| 2014/0343795 A1 | 11/2014 | Lavoie |

(56) References Cited

U.S. PATENT DOCUMENTS

| | | | |
|---|---|---|---|
| 2015/0002670 | A1 | 1/2015 | Bajpai |
| 2015/0115571 | A1 | 4/2015 | Zhang et al. |

FOREIGN PATENT DOCUMENTS

| | | |
|---|---|---|
| CN | 202159367 U | 3/2012 |
| CN | 202541524 U | 11/2012 |
| DE | 3931518 A1 | 4/1991 |
| DE | 9208595 U1 | 8/1992 |
| DE | 10065230 A1 | 7/2002 |
| DE | 10154612 A1 | 5/2003 |
| DE | 102005043467 A1 | 3/2007 |
| DE | 102005043468 A1 | 3/2007 |
| DE | 102006035021 | 1/2008 |
| DE | 102006048947 A1 | 4/2008 |
| DE | 102008020838 A1 | 11/2008 |
| DE | 102008045436 A1 | 3/2010 |
| DE | 102009012253 A1 | 9/2010 |
| DE | 102010004920 A1 | 7/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102011108440 A1 | 1/2013 |
| EP | 0418653 A1 | 3/1991 |
| EP | 0849144 A2 | 6/1998 |
| EP | 1312492 A2 | 5/2003 |
| EP | 1695888 A2 | 8/2006 |
| EP | 1593552 B1 | 3/2007 |
| EP | 2168815 A1 | 3/2010 |
| EP | 2199188 A2 | 6/2010 |
| EP | 2452549 A1 | 5/2012 |
| EP | 2551132 A1 | 1/2013 |
| EP | 2644477 A1 | 10/2013 |
| EP | 1569073 B1 | 9/2014 |
| EP | 2803944 A2 | 11/2014 |
| FR | 2515379 A1 | 10/1981 |
| FR | 2606717 A1 | 5/1988 |
| FR | 2716145 A1 | 8/1995 |
| FR | 2786456 A1 | 6/2000 |
| FR | 2980750 A1 | 4/2013 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 63-085568 | 6/1988 |
| JP | 06-028598 A | 4/1994 |
| JP | 2003148938 A | 5/2003 |
| JP | 2003175852 A | 6/2003 |
| JP | 2004114879 A | 4/2004 |
| JP | 2008123028 A | 5/2008 |
| JP | 2009171122 A | 7/2009 |
| JP | 2012166647 A | 9/2012 |
| JP | 2014034289 A | 2/2014 |
| KR | 20060012710 A | 2/2006 |
| KR | 20060133750 A | 12/2006 |
| KR | 20110114897 A | 10/2011 |
| KR | 20140105199 A | 9/2014 |
| TW | 200930010 A | 7/2009 |
| WO | 8503263 A1 | 8/1985 |
| WO | 2011117372 A1 | 9/2011 |
| WO | 2014019730 A1 | 2/2014 |
| WO | 2014037500 A1 | 3/2014 |
| WO | 2014123575 A1 | 8/2014 |
| WO | 2015074027 A1 | 5/2015 |

OTHER PUBLICATIONS

Verma, V.S.; Guntur, R.R.; Womg, J.Y.; "Directional Behavior During Braking of a Tractor/Semitrailer", TRID, International Journal of Vehicle Design, May 1980, pp. 195-220, vol. 1, No. 3, Inderscience Enterprises Limited, ISSN: 1477-5360.
"Ford Super Duty: Truck Technology", Brochure, www.media.ford.com, Sep. 2011, pp. 1-2.
"Ford Guide to Towing", Trailer Life, Magazine, 2012, pp. 1-38.
"Dodge Dart: The Hot Compact Car", Brochure, www.dart-mouth.com/enginerring-development.html, pp. 1-6; date unknown.
M. Wagner, D. Zoebel, and A. Meroth, "Adaptive Software and Systems Architecture for Driver Assistance Systems" International Journal of Machine Learning and Computing, Oct. 2011, vol. 1, No. 4, pp. 359-365.
Christian Lundquist, Wolfgang Reinelt, Olof Enqvist, "Back Driving Assistant for Passenger Cars with Trailer", SAE Int'l, ZF Lenksysteme Gmbh, Schwaebisch Gmuend, Germany, 2006, pp. 1-8.
"Understanding Tractor-Trailer Performance", Caterpillar, 2006, pp. 1-28.
Divelbiss, A.W.; Wen, J.T.; "Trajectory Tracking Control of a Car-Trailer System", IEEE, Control Systems Technology, Aug. 6, 2002, vol. 5, No. 3, ISSN: 1063-6536, pp. 269-278.
Stahn, R.; Heiserich, G.; Stopp, A., "Laser Scanner-Based Navigation for Commercial Vehicles", IEEE, Intelligent Vehicles Symposium, Jun. 2007, pp. 969-974, print ISBN: 1931-0587.
Widrow, B.; Lamego, M.M., "Neurointerfaces: Applications", IEEE, Adaptive Systems for Signal Processing, Communications, and Control Symposium, Oct. 2000, pp. 441-444.
Dieter Zoebel, David Polock, Philipp Wojke, "Steering Assistance for Backing Up Articulated Vehicles", Systemics, Cybernetics and Informatics, Universitaet Koblenz-Landau, Germany, vol. 1, No. 5, pp. 101-106; date unknown.
Stephen K. Young, Carol A. Eberhard, Philip J. Moffa, "Development of Performance Specifications for Collision Avoidance Systems for Lane Change, Merging and Backing", TRW Space and Electronics Group, Feb. 1995, pp. 1-31.
Ford Motor Company, "09 F-150", Brochure, www.fordvehicles.com, pp. 1-30; date unknown.
Michael Paine, "Heavy Vehicle Object Detection Systems", Vehicle Design and Research Pty Lmited for VicRoads, Jun. 2003, pp. 1-22.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.
"2012 Edge—Trailer Towing Selector", Brochure, Preliminary 2012 RV & Trailer Towing Guide Information, pp. 1-3.
"Meritor Wabco Reverse Detection Module for Trailers with 12-Volt Constant Power Systems", Technical Bulletin, TP-02172, Revised Oct. 2004, pp. 1-8.
Simonoff, Adam J., "USH0001469 Remotely Piloted Vehicle Control and Interface System", Aug. 1, 1995, pp. 1-7.
"Range Rover Evoque's Surround Camera System"; MSN Douglas Newcomb Jun. 15, 2012, pp. 1-2.
"Electronic Trailer Steering", VSE, Advanced Steering & Suspension Solutions, Brochure, 2009, The Netherlands, pp. 1-28.
"WABCO Electronic Braking System—New Generation", Vehicle Control Systems—An American Standard Company, www.wabco-auto.com, 2004, pp. 1-8.
T. Wang, "Reverse-A-Matic-Wheel Direction Sensor System Operation and Installation Manual", Dec. 15, 2005, pp. 1-9.
"Wireless-Enabled Microphone, Speaker and User Interface for a Vehicle", The IP.com, Aug. 26, 2004, pp. 1-5, IP.com disclosure No. IPCOM000030782D.
"RFID Read/Write Module", Grand Idea Studio, 2013, pp. 1-3, website, http://www.grandideastudio.com/portfolio/rfid-read-write-module/.
Laszlo Palkovics, Pal Michelberger, Jozsef Bokor, Peter Gaspar, "Adaptive Identification for Heavy-Truck Stability Control", Vehicle Systems Dynamics Supplement, vol. 25, No. sup1, 1996, pp. 502-518.
"Convenience and Loadspace Features" Jaguar Land Rover Limited, 2012, pp. 1-15, http://www.landrover.com/us/en/lr/all-new-range-rover/explore/.
"Delphi Lane Departure Warning", Delphi Corporation, Troy, Michigan pp. 1-2; date unknown.
Micah Steele, R. Brent Gillespie, "Shared Control Between Human and Machine: Using a Haptic Steering Wheel to Aid in Land Vehicle Guidance", University of Michigan, pp. 1-5; date unknown.
"Electric Power Steering", Toyota Hybrid System Diagnosis-Course 072, Section 7, pp. 1-10; date unknown.

(56) References Cited

OTHER PUBLICATIONS

"Telematics Past, Present, and Future," Automotive Service Association, www.ASAshop.org, May 2008, 20 pgs.
"Fully Automatic Trailer Tow Hitch With LIN Bus," https://webista.bmw.com/webista/show?id=1860575499&lang=engb&print=1, pp. 1-5; date unknown.
Nüsser, René; Pelz, Rodolfo Mann, "Bluetooth-based Wireless Connectivity in an Automotive Environment", VTC, 2000, pp. 1935-1942.
Whitfield, Kermit, "A Hitchhiker's Guide to the Telematics Ecosystem", Automotive Design & Production, Oct. 1, 2003, 3 pgs.
Narasimhan, N.; Janssen, C.; Pearce, M.; Song, Y., "A Lightweight Remote Display Management Protocol for Mobile Devices", 2007, IEEE, pp. 711-715.
Microsoft, Navigation System, Sync Powered by Microsoft, Ford Motor Company, Jul. 2007, 164 pgs.
Microsoft, Supplemental Guide, Sync Powered by Microsoft, Ford Motor Company, Nov. 2007, 86 pgs.
Voelcker, J., "Top 10 Tech Cars: It's the Environment, Stupid", IEEE Spectrum, Apr. 2008, pp. 26-35.
Microsoft, Navigation System, Sync Powered by Microsoft, Ford Motor Company, Oct. 2008, 194 pgs.
Microsoft, Supplemental Guide, Sync Powered by Microsoft, Ford Motor Company, Oct. 2008, 83 pgs.
Chantry, Darryl, "Mapping Applications to the Cloud", Microsoft Corporation, Jan. 2009, 20 pgs.
Yarden, Raam; Surage Jr., Chris; Kim, Chong Il; Doboli, Alex; Voisan, Emil; Purcaru, Constantin, "TUKI: A Voice-Activated Information Browser", 2009, IEEE, pp. 1-5.
Gil-Castiñeira, Felipe; Chaves-Diéguez, David; González-Castaño, Francisco J., "Integration of Nomadic Devices with Automotive User Interfaces", IEEE Transactions on Consumer Electronics, Feb. 2009, vol. 55, Issue 1, pp. 34-41.
Microsoft, Navigation System, Sync Powered by Microsoft, Ford Motor Company, Jul. 2009, 196 pgs.
Microsoft, Supplemental Guide, Sync Powered by Microsoft, Ford Motor Company, Aug. 2009, 87 pgs.
Goodwin, Antuan, "Ford Unveils Open-Source Sync Developer Platform", The Car Tech Blog, Oct. 29, 2009, 5 pgs. [Retrieved from http://reviews.cnet.com/8301-13746_7-10385619-48.html on Feb. 15, 2011].
Lamberti, Ralf, "Full Circle: The Rise of Vehicle-Installed Telematics",Telematics Munich, Nov. 10, 2009, 12 pgs.
"Apple Files Patent Which Could Allow You to Control Your Computer Remotely Using iPhone", Dec. 18, 2009, 7 pgs [Retrieved from www.iphonehacks.com on Jun. 22, 2010].
Newmark, Zack, "Student develop in-car cloud computing apps; envision the future of in-car connectivity", May 4, 2010, 3 pgs [Retrieved from www.worldcarfans.com on Jun. 18, 2010].
"Service Discovery Protocol (SDP)", Palo Wireless Bluetooth Resource Center, 7 pgs [Retrieved from http://palowireless.com/infotooth/tutorial/sdp.asp on Aug. 3, 2010].
Sonnenberg, Jan, "Service and User Interface Transfer from Nomadic Devices to Car Infotainment Systems", Second International Conference on Automotive User Interfaces and Interactive Vehicular Applications (Automotive UI), Nov. 11-12, 2010, pp. 162-165.
"MobileSafer makes it easy to keep connected and safe", ZoomSafer Inc., 2010, 5 pgs. [Retrieved from http://zoomsafer.com/products/mobilesafer on Dec. 28, 2010].
"PhonEnforcer FAQs", Turnoffthecellphone.com, 3 pgs. [Retrieved from http://turnoffthecellphone.com/faq.html on Dec. 28, 2010].
"How PhonEnforcer Works", Turnoffthecellphone.com, 2 pgs. [Retrieved from http://turnoffthecellphone.com/howitworks.htm on Dec. 28, 2010].
European Patent Office, European Search Report for Application No. EP11151623, Feb. 15, 2011, 7 pgs.
Wikipedia, "X Window System", Wikipedia, The Free Encyclopedia, date unknown, 19 pgs. [Retrieved from http://en.wikipedia.org/w/index.php?title=X_Window_System&oldid=639253038].

\* cited by examiner

METHODS AND SYSTEMS FOR CONFIGURING OF A TRAILER MANEUVERING SYSTEM

CROSS-REFERENCE TO RELATED APPLICATIONS

This patent application is a continuation-in-part of U.S. patent application Ser. No. 14/290,243, which was filed on May 29, 2014, entitled "SYSTEM AND METHIOD FOR ADJUSTING AN IMAGE CAPTURE SETTING," which is a continuation-in-part of U.S. patent application Ser. No. 14/249,781, which was filed on Apr. 10, 2014, entitled "SYSTEM AND METHOD FOR CALCULTING A HORIZONTAL CAMERA TO TARGET DISTANCE," which is a continuation-in-part of U.S. application Ser. No. 14/201,130 which was filed on Mar. 7, 2014, entitled "SYSTEM AND METHOD OF CALIBRATING A TRAILER BACKUP ASSIST SYSTEM," which is a continuation-in-part of U.S. patent application Ser. No. 14/068,387, which was filed on Oct. 31, 2013, entitled "TRAILER MONITORING SYSTEM AND METHOD." The aforementioned related applications are hereby incorporated by reference in their entirety.

FIELD OF THE INVENTION

The present invention generally relates to a setup interface for a vehicle system, more particularly to a setup system for a vehicle trailer maneuvering system.

BACKGROUND OF THE INVENTION

Operating a vehicle with a trailer in tow is very challenging for many drivers. This is particularly true for drivers that are unskilled at backing vehicles with attached trailers, which may include those that drive with a trailer on an infrequent basis (e.g., have rented a trailer, use a personal trailer on an infrequent basis, etc.). The disclosure provides for systems and methods to assist in setting up a trailer maneuvering system to ensure that such systems are accessible and easy to utilize.

SUMMARY OF THE INVENTION

According to one aspect of the present invention, a system for configuring a trailer model for a trailer maneuvering system is disclosed. The system comprises a controller having a memory and being operable to communicate with the trailer maneuvering system. The controller is configured to receive trailer dimensional data from a mobile device. The trailer dimensional data may then be stored in the memory as a first trailer profile. The controller is operable to access the trailer dimensional data in the first trailer profile to determine at least one vehicle operation configured to maneuver the trailer.

According to another aspect of the present invention, a system for configuring a trailer model for at least one vehicle utilizing a mobile device is disclosed. The mobile device is configured to capture a trailer profile comprising trailer dimensional data and communicate the trailer profile to a first controller of a first trailer maneuvering system corresponding to a first vehicle. The first controller is operable to access the trailer profile to determine at least one vehicle operation configured to maneuver the trailer.

According to yet another aspect of the present invention, a method for configuring a trailer model on a mobile device in connection with a trailer maneuvering system is disclosed. The method comprises displaying a setup instruction. The setup instruction is configured to identify at least one characteristic corresponding to a trailer. The mobile device is configured to receive an input corresponding to the at least one characteristic of the trailer. The mobile device may then communicate the at least one characteristic to the trailer maneuvering system, wherein the at least one characteristic comprises data utilized by the trailer maneuvering system to maneuver the trailer.

These and other aspects, objects, and features of the present invention will be understood and appreciated by those skilled in the art upon studying the following specification, claims, and appended drawings.

DETAILED DESCRIPTION OF THE PREFERRED EMBODIMENTS

The disclosure provides for a mobile device in communication with a controller of a vehicle. The controller is further in communication with a trailer maneuvering system of the vehicle. The trailer maneuvering system is operable to utilize a kinematic model of a trailer to control a maneuvering operation of the trailer. The maneuvering operation may include a reverse or backup operation that is controlled by the controller by monitoring and/or calculating a hitch angle between the vehicle and the trailer. The hitch angle may refer to an offset in an alignment of the trailer relative to a forward direction of the trailer.

In some implementations, the trailer maneuvering system may require a setup operation providing for a kinematic model of a particular trailer to be input into the controller. Once input, the trailer maneuvering system may utilize specific dimensions of a trailer to calculate and control the steering of the vehicle to assist an operator of the vehicle in maneuvering the trailer. For further information regarding trailer maneuvering systems, refer to: U.S. Pat. No. 9,248,858 which was issued on Feb. 2, 2016, entitled "TRAILER BACKUP ASSIST SYSTEM;" U.S. application Ser. No. 14/201,130 which was filed on Mar. 7, 2014, entitled "SYSTEM AND METHOD OF CALIBRATING A TRAILER BACKUP ASSIST SYSTEM;" and U.S. Pat. No. 9,102,271, which was issued on Aug. 11, 2015, entitled "TRAILER MONITORING SYSTEM AND METHOD" each of which is incorporated by reference herein. The disclosure provides for additional functionality for trailer maneuvering systems and may provide for an enhanced setup of a trailer maneuvering system by utilizing a mobile device to assist in a setup operation.

Figure 1:
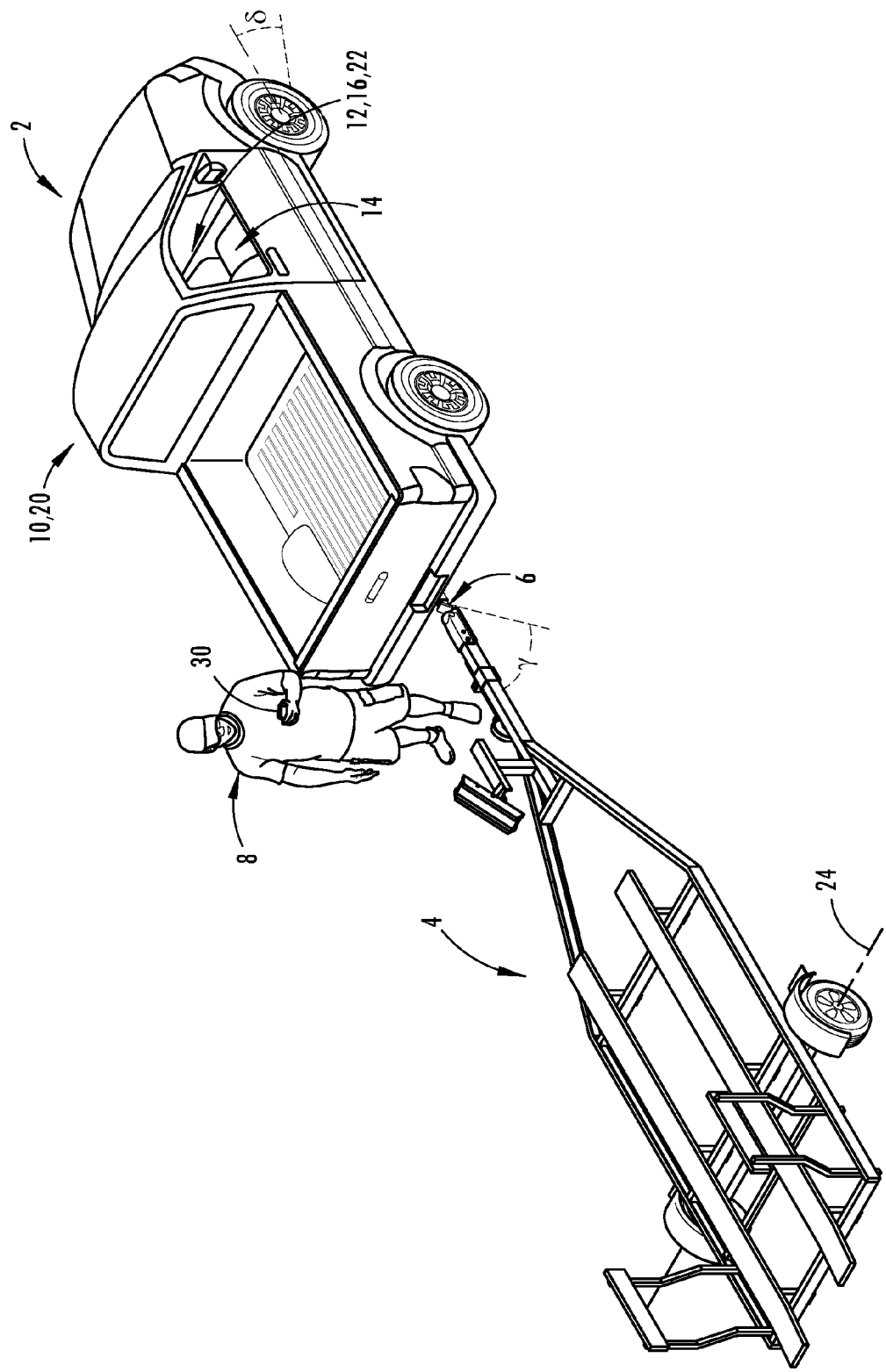
FIG. 1 is an environmental view of a trailer maneuvering system comprising a controller in communication with a mobile device.

Referring to FIG. 1, a schematic diagram illustrating a vehicle 2 coupled to a trailer 4 is shown in accordance with the disclosure. The vehicle 2 and the trailer 4 are coupled about a hitch point 6 and are operable to maneuver in a turning configuration angled at a hitch angle γ. The hitch angle γ is defined as the difference between a vehicle heading and a trailer heading about the hitch point 6. When the trailer 4 is angled relative to the vehicle 2 at the hitch angle γ, it may be challenging for an operator 8 of the vehicle 2 to control the direction of the trailer 4. The disclosure provides for a system and method for setting up and configuring a trailer maneuvering system to assist in maneuvering the trailer 4.

The vehicle 2 is equipped with a trailer maneuvering system 10 or backup assist system configured to control the vehicle 2 during a reversing or backup operation of the trailer 4. The trailer maneuvering system 10 is controlled by the operator of the vehicle 2 via an interface configured to receive a directional input, for example a steering input apparatus 12 disposed in a passenger compartment 14 of the vehicle 2. The steering input apparatus 12 may be configured to control a reversing operation of the vehicle 2 and the trailer 4 in response to receiving an input corresponding to the hitch angle γ. As the vehicle 2 moves in a backup operation, the hitch angle γ may be updated by the trailer maneuvering system 10 and adjusted by changing a steering angle δ of the vehicle 2.

The vehicle 2 may further be equipped with a display or screen 16 disposed in the passenger compartment 14. The screen 16 is operably coupled to a controller 20. In some implementations, the screen 16 comprises a human machine interface (HMI) 22 configured to provide access to a variety of settings and controls of the trailer maneuvering system 10. The HMI 22 may further be operable to display an image corresponding to a model of the vehicle 2 and the trailer 4 as a reference of a trailer angle γ. The HMI 22 may further provide a setup apparatus configured to provide instructions for setting up the trailer maneuvering system 10. A setup operation of the trailer maneuvering system 10 may include entering setup information corresponding to dimensions of the trailer 4 for the kinematic model and additional steps for configuring the system 10 for a particular trailer.

In some cases, entering setup information for the trailer maneuvering system 10 may include complicated measuring steps that may be challenging for some operators. For example, in some cases, an operator may be required to record multiple measurements to define a kinematic model to allow the trailer maneuvering system 10 to accurately control a direction of the trailer 4. In such cases, the operator 8 may be required to manually enter each measurement into the HMI 22 as required to define the kinematic model. Some examples of dimensions that may be utilized in the kinematic model for the trailer 4 may include: a trailer length, a wheel base, a tongue length, an overall length, an overall width, etc.

The disclosure provides for various systems and methods that may be utilized to provide instructions to the operator 8 in order to quickly and accurately setup the trailer maneuvering system 10. In some implementations, the controller 20 may be in communication with a mobile device 30. The mobile device 30 may be configured to operate an application and/or receive instructions from the controller 20 to assist an operator of the vehicle 2 in entering the dimensional data and additional setup information for the trailer 4. In some implementations, the mobile device 30 may comprise a camera system or imager operable to capture at least one image associated with a characteristic, dimensional data, and/or any image data that may be utilized in the setup process and/or utilization of the trailer maneuvering system 10. The mobile device 30 may comprise various types of mobile devices, for example a camera, cellular phone, smart phone, tablet, laptop, notebook, gaming device, etc. Additional details of an exemplary mobile device corresponding to the mobile device 30 are discussed in reference to FIG. 6.

The mobile device 30 may be configured to provide a portable user interface to provide instructions to the operator 8 corresponding to specific steps required to enter setup information for the trailer maneuvering system 10. For example, a trailer length may be defined as a distance from the hitch point 6 to a trailer axle center line 24 or an effective trailer axle center line for trailers comprising multiple axles. In some implementations, the mobile device 30 may be configured to provide pictures of how the operator 8 may utilize a tape measure to measure the trailer length. With the trailer length measured, the mobile device 30 may prompt the operator 8 to enter the trailer length. Once the trailer length is entered on the mobile device 30, the mobile device 30 may communicate the trailer length to the controller 20 for utilization by the trailer maneuvering system 10.

The camera system of the mobile device 30 may be configured to capture image data corresponding to the measurement of the trailer length or any other dimensional measurement of the trailer to determine the dimensional proportion of the trailer 4. For example, a measurement shown on the tape measure may be identified by one or more processors of the mobile device by utilizing an optical character recognition (OCR) conversion process to digitize the measurement and identify a dimension of the trailer 4 shown on the tape measure or any measuring device. Once the trailer length is identified, the mobile device 30 may communicate the trailer length to the controller 20 such that the trailer maneuvering system 10 may utilize the measurement in a kinematic model of the trailer 4. The mobile device 30 may further be operable to store various dimensions and properties of the trailer to generate a profile for the trailer 4. The profile may correspond to a data file, matrix, and/or list detailing dimensions and properties of the trailer stored in a memory in the form of a non-transient storage device. The profile may be accessed by the mobile device 30 to program the profile of the trailer 4 to the vehicle 2 or any other vehicle that is compatible with the profile.

Figure 2:
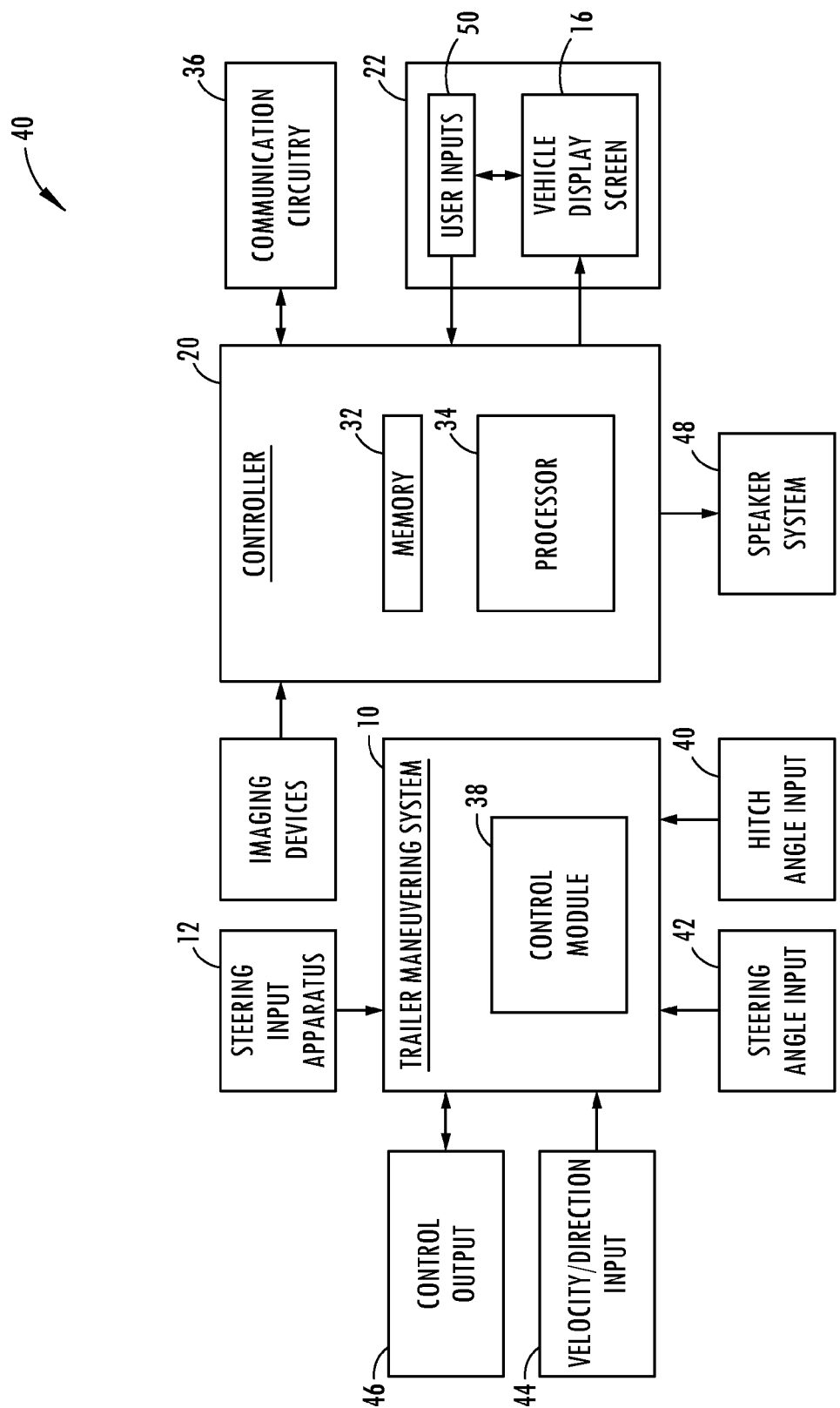
FIG. 2 is a block diagram of a controller of a vehicle in communication with a trailer maneuvering system.

Referring now to FIG. 2, the controller 20 is in communication with the trailer maneuvering system 10. In various implementations, the controller 20 may be combined or in communication with the trailer maneuvering system 10 as discussed herein. The controller 20 comprises a memory 32 and a processor 34 in communication with the trailer maneuvering system 10 and is operable to store and process data corresponding to a trailer profile. The trailer profile may comprise any form of dimensional data corresponding to the trailer 4 and may be configured to describe dimensional information corresponding to a kinematic model of the trailer 4. The trailer profile may also include any information corresponding to the trailer, for example, image data, trailer brake system information and settings, maintenance reminders, etc. The trailer profile as well as a trailer maneuvering system setup software may be stored in the memory 32 such that the trailer profile may be stored and communicated to the trailer maneuvering system 10 of the vehicle 2.

The controller 20 may be in communication with the mobile device 30 via a communication circuitry 36 operable to wirelessly transmit and receive data. The communication circuitry 36 may include a radio frequency transmitter and receiver for transmitting and receiving signals. The signals may be configured to transmit data and may correspond to various communication protocols. The communication circuitry 36 may be configured to operate in a mobile communications system and may be used to send and receive data and/or audiovisual content. Receiver types for interaction with the communication circuitry 36 may include GSM, CDMA, WCDMA, GPRS, MBMS, WiFi, WiMax, DVB-H, ISDB-T, etc., as well as advanced communication protocols that may be developed at a later time.

The trailer maneuvering system 10 comprises a control module 38 in communication with a hitch angle input 40 and a steering angle input 42 configured to receive data from a steering input apparatus, and a hitch angle detection apparatus. The control module 38 is further in communication with a velocity/direction input 44 configured to provide velocity and directional feedback to the control module 38. Based on an input by an operator into the steering input apparatus 12, the control module 38 is operable to control the steering angle δ and a resulting hitch angle γ of the vehicle 2 relative to the trailer 4. In this way, the operator 8 may complete various operations to maneuver the trailer 4.

To control the maneuvering of the vehicle 2, the control module 38 is configured to output commands and receive feedback from a brake control system, a powertrain control system, and a power steering control system. The commands are output via a control output 46 of the trailer maneuvering system 10. Though the control output 46 is shown as a single communication interface in FIG. 2, the control output 46 may comprise a plurality of control outputs configured to control the vehicle 2 in response to an input from the steering input apparatus 12. In operation, the control module 38 is operable to maneuver the vehicle 2 to achieve a path for the trailer 4 as requested via the steering input apparatus 12. The path of travel of the vehicle 2 and the trailer 4 as well as the hitch angle γ are adjusted in response to an operator input into the steering input apparatus 12. Further detailed implementations of a trailer backup assist module are described in U.S. patent application Ser. No. 14/294,489, which is incorporated herein by reference in its entirety.

Additional features of the controller 20 may include various controls and outputs configured to control additional systems of the vehicle 2. For example, the controller 20 may be operable to provide instruction to the operator of the vehicle 2 in the form of audible commands via a vehicle speaker system 48 and/or parking aid speakers, the screen 16, additional vehicle displays (e.g. a navigation or text display), etc. In this way, the controller 20 is operable to engage the operator 8 of the vehicle 2 in various ways to ensure that the steps for entering the setup information for the trailer maneuvering system 10 are clearly communicated to the operator.

The HMI 22 is in communication with the controller 20 and the screen 16 to provide the operator of the vehicle 2 with reference information generated by the controller 20. The reference information may include an image or graphical representation of the vehicle 2 and/or the trailer 4. The HMI 22 comprises user inputs 50 that may be utilized to input the setup information for the trailer maneuvering system 10. In some implementations, the HMI 22 may comprise a touch screen such that the user inputs 50 are incorporated as soft keys having functions controlled by the controller 20 and configured to display specific options to enter the setup information and control the trailer maneuvering system 10. The touch screen may comprise a capacitive, acoustic wave, resistive infrared, optical, or any other form of touch screen.

Figure 3A:
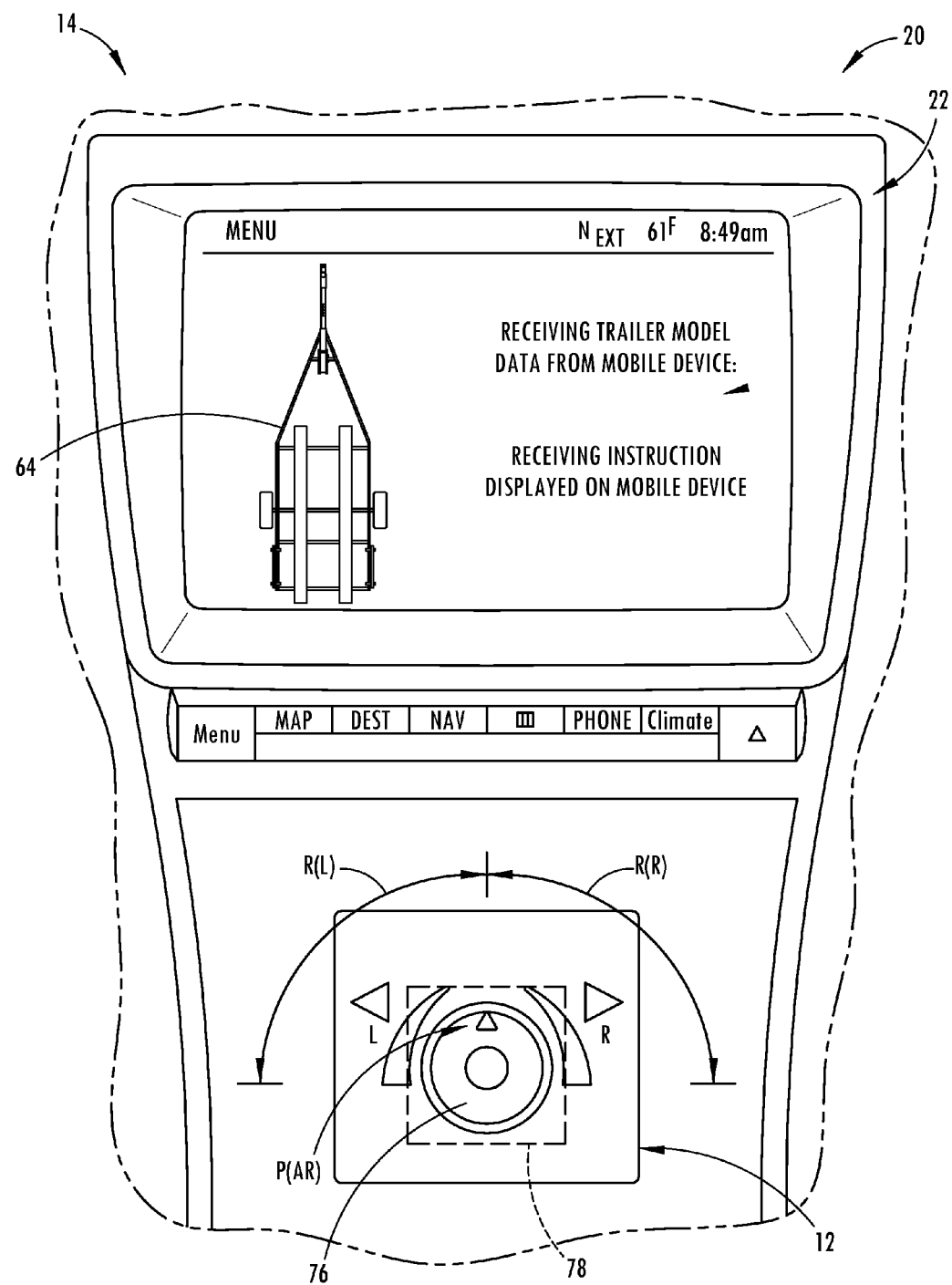
FIG. 3A is a diagram of an human machine interface of a controller of a vehicle in communication with a mobile device.
Figure 3B:
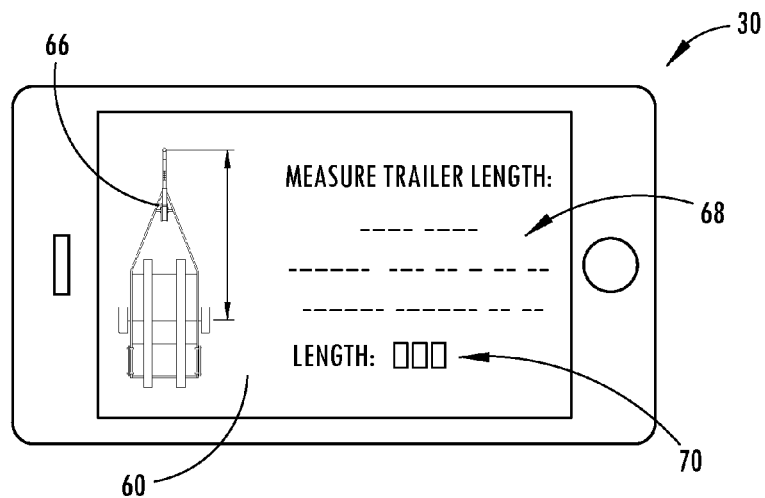
FIG. 3B is a diagram of a mobile device in communication with a controller of a vehicle.

Referring now to FIGS. 3A and 3B, a setup mode for the trailer maneuvering system 10 is shown on the screen 16 of the HMI 22 and further on a screen 60 of the mobile device 30. As discussed herein, the mobile device 30 is configured to receive instructions and/or operate software in communication with the controller 20 such that the mobile device 30 may be utilized to display instructions and receive information corresponding to the setup of the trailer maneuvering system 10. In this implementation, the HMI 22 is demonstrated in a vehicle console located in the passenger compartment 14 of the vehicle. With the mobile device 30 in communication with the controller 20, each step or instruction of the installation process may be synced and communicated for display on the screen 60 of the mobile device 30 and the HMI 22.

In some implementations, the mobile device 30 may also be configured to run setup software configured to perform steps for the setup of the trailer maneuvering system 10 independent of the controller 20. The setup software may be stored in a memory of the mobile device 30 and include various steps and instructions configured to provide instructions to a processor of the mobile device 30 to complete the setup and generate a profile for a particular trailer. The mobile device 30 may store the profile corresponding to a specific trailer in the memory of the mobile device 30. In this way, the mobile device may store the profile in memory and load the profile of a trailer to any vehicle configured to communicate, and/or compatible to utilize the profile created by utilizing the setup software.

For example, the mobile device may store the profile for trailer 4 demonstrated in FIG. 1 in the memory of the mobile device 30 and load the profile to the controller 20 of the vehicle 2. Further, the mobile device 30 may retain the trailer profile in memory and similarly communicate the trailer profile to a different vehicle. The mobile device 30 may provide for various vehicles to quickly and easily acquire setup information, including dimensional information, images, etc., to setup a compatible trailer maneuvering system for a trailer.

The controller 20 may further be operable to access a plurality of instructions corresponding to the setup of the trailer maneuvering system 10. In some implementation, the controller 20 may display a message 62 on the screen 16 alerting the operator that the controller 20 is receiving trailer model data from the mobile device 30. The controller 20 may further display a graphic 64 or image representing the trailer 4 and a current step of the setup of the trailer maneuvering system 10 for the trailer 4. The mobile device 30 may communicate data corresponding to a trailer profile to the controller via the communication circuitry 36 for each step of the setup process individually, after the setup process is complete, and/or in various data transfer stages throughout the setup of the trailer maneuvering system 10.

The mobile device 30 may be operable to process each of the steps of the setup of the trailer maneuvering system 10 by receiving instructions from the controller 20 via the communication circuitry 36 and/or by completing processing steps stored in a memory in the form of a software application. The processing steps may include image, graphics, detailed text instructions, audio instructions, video instructions, and various forms of media configured to assist in the setup process. As shown in FIG. 3B, a graphic 66 demonstrating a current measurement step of the setup process is shown and is displayed on the screen 60. Further, a text message 68 is displayed on the screen 60. A data entry field 70 is also displayed on the screen 60 such that the operator may input a measurement for a setup step of the trailer maneuvering system 10. A measurement may be entered via a keyboard or soft keys incorporated on the screen 60 to populate the data entry field 70. The measurement may correspond to a measurement described in the text message 68 and demonstrated by the graphic 66.

The mobile device 30 may further be configured to access a variety of informative media relating to the setup of the trailer maneuvering system 10. The media may be accessed from the controller 20 via the communication circuitry, a memory of the mobile device, and may also be accessed via a wireless network (e.g. a wireless data network). The mobile device may be configured to communicate with the communication circuitry 36 and/or the wireless network via a communication circuit 158 as discussed in reference to FIG. 6. In some implementations, the mobile device 30 may further be operable to communicate with a wireless server providing for real time help, such as live chat and/or live video support via the wireless network. In this way, the setup of the trailer maneuvering system 10 may be completed efficiently by accessing a variety of instructions providing for a convenient and simple setup process.

Referring again to FIG. 3A, the steering input apparatus 12 is shown in the passenger compartment 14. The steering input apparatus 12 may comprise a rotatable control element in the form of a knob 76. The knob 76 is further coupled to a movement sensing device 78 in communication with the controller 20. The knob 76 may be biased (e.g., by a spring return) to an at-rest position P(AR) between opposing rotational ranges of motion R(R), R(L). A force that biases the knob 76 toward the at-rest position P(AR) can increase (e.g., non-linearly) as a function of the amount of rotation of the knob 82 with respect to the at-rest position P(AR). The knob 76 may be used for entry and selection of various modes, setup options, and data entry corresponding to the setup of the trailer maneuvering system 10 to operate with the trailer 4.

Figure 4:
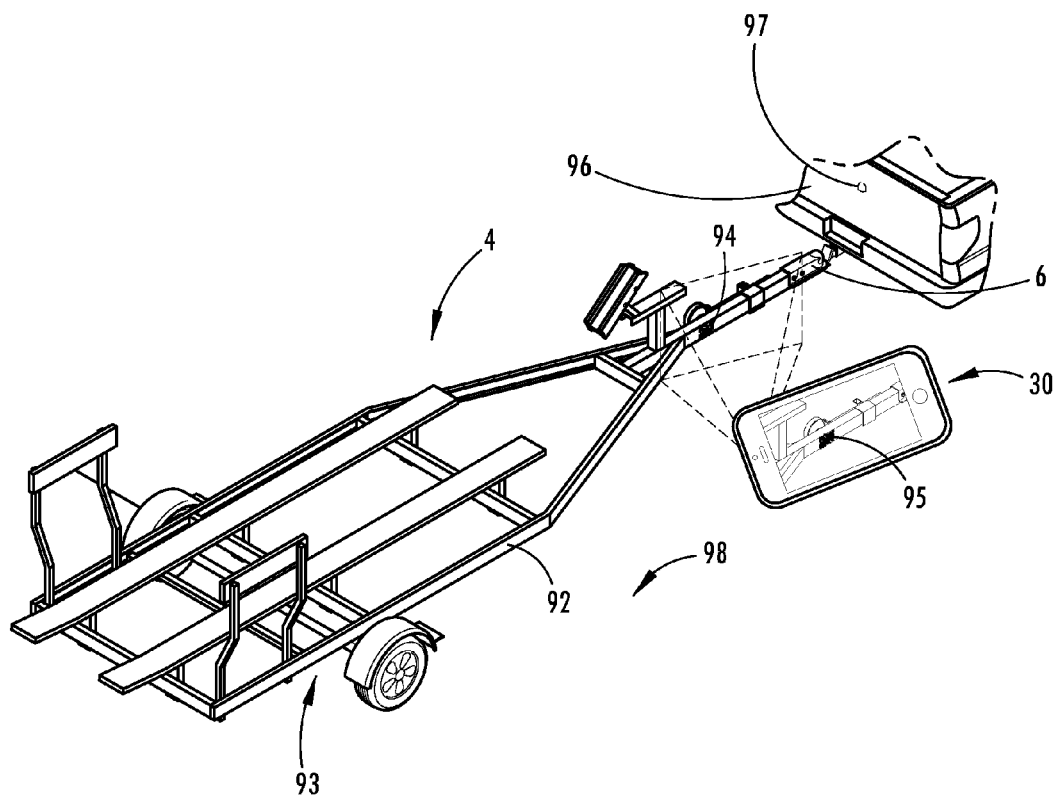
FIG. 4 is a diagram of a mobile device capturing an image to identify at least one characteristic of a trailer.

Referring now to FIG. 4, the mobile device 30 may be operable to capture one or more images of at least one characteristic of the trailer 4. A characteristic may include a structural portion (e.g. a length 92 of a frame 93), name, model number, a picture of a measurement, and in some cases may include a coded data marking 94 on the trailer 4. The coded data marking 94 may be captured as coded image data 95 on the mobile device 30 and include a symbol, model number, a barcode, a QR code, and any other form of coded data that may be captured by a camera system of the mobile device 30. The coded data marking 94 may include model information, dimensional data, and any other data describing the trailer 4. In some implementations, the coded data marking 94 may include all of the dimensional data of the trailer 4, such that the dimensional data for the setup of the trailer maneuvering system 10 is described in the coded data marking 94.

In some implementations, the mobile device 30 may be configured to utilize an optical character recognition (OCR), a decoding algorithm, a digitizing procedure, and additional methods to identify the model information and/or dimensional data (the trailer data hereinafter) from the one or more images. In some implementations, the trailer data may then be sorted and entered into a trailer profile to generate the kinematic model for the trailer 4. Once the trailer data is configured for application into the kinematic model, the mobile device 30 may communicate the trailer data in the form of the trailer profile to the controller 20 via the communication circuitry 36. In this way, the steps required for the setup of the trailer maneuvering system 10 may be significantly reduced.

The mobile device 30 may further be configured to access additional information corresponding to the trailer 4 by accessing a remote server via the communication circuit 158. For example, if a model number of the trailer 4 is entered into the mobile device 30 or identified in the coded image data 95 from the coded data marking 94, the mobile device may search the remote server (e.g. a public or private internet server) for trailer data corresponding to the model. If the model number of the trailer is identified, the mobile device 30 may access the corresponding trailer data from the remote server and download the trailer data to the memory of the mobile device 30. The mobile device 30 may then communicate the trailer data to the communication circuitry 36 of the controller 20 to facilitate the setup of the trailer 4 for use with the trailer maneuvering system 10.

In some implementations, the mobile device 30 may be operable to capture alternate dimensional data as image data on the mobile device. Alternate dimensional data may correspond to dimensional data that may be utilized by the control module 38 of the trailer maneuvering system 10 to control a path of curvature of the trailer 4. In an exemplary implementation, the alternate dimensional data may correspond to a distance between a first reference point and a second reference point on the vehicle 2 and/or the trailer 4. Some examples of reference points may include: the hitch point 6, a fore/aft location of a rear facing portion 96 (e.g. a license plate, lift gate, etc.) of the vehicle 2, a location of a reverse camera 97, a ground level 98 relative to the vehicle 2, and the coded data marking 94 or any marking or feature of the vehicle 2 that may be identified by the mobile device 30.

By capturing image data demonstrating a first reference point and a second reference point, the mobile device 30 may compare the distance between the first reference point and the second reference point with at least one identifiable dimension. The identifiable dimension may correspond to an identifiable feature of the vehicle 2 and/or the trailer 4. Based on this comparison the mobile device 30 may be operable to determine a reference distance between the first reference point and the second reference point and utilize the reference distance as dimensional data for the setup of the trailer maneuvering system 10.

For example, during a setup operation, the mobile device 30 may instruct an operator to take a picture of a side profile of the vehicle 2 and the trailer 4 centered about the hitch point 6. Once captured, the image data may include a variety of identifiable features having known dimensions. Some such features may include a vertical or horizontal dimension of a tail light, a lift gate, a bumper, a box side, a diameter of a wheel, etc. By comparing a known or user entered dimension of at least one identifiable feature, the mobile device 30 may utilize the relative distance between a first reference point (e.g. the hitch point 6) and a second reference point (e.g. the reverse camera 97) to identify a reference distance therebetween. At least one method of calculating a reference distance may include a comparison of a pixel count of the reference distance to the known or user entered dimension of at least one identifiable feature in the image data. In this way, the mobile device 30 is operable to determine the reference distance in the image data and utilize the reference distance as dimensional data for the setup of the trailer maneuvering system 10.

Figure 5:
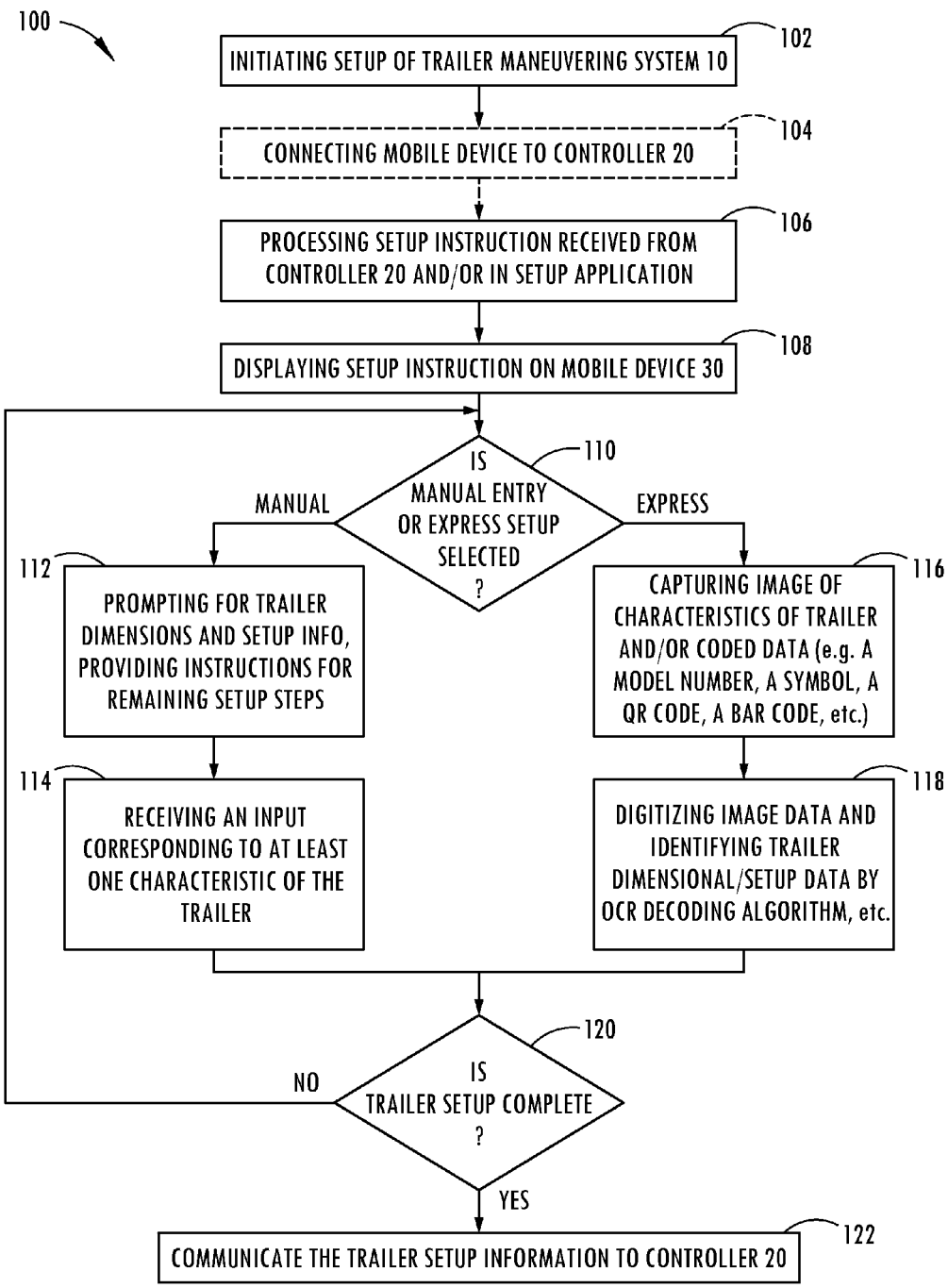
FIG. 5 is a flow chart of a method for utilizing a mobile device to input a dimensional characteristic of a trailer.

Referring to FIG. 5, a flowchart is shown demonstrating a method 100 for utilizing the mobile device 30 to assist in a setup operation of the trailer maneuvering system 10. The method 100 may begin by initializing a setup operation for the trailer maneuvering system 10 (102). The setup may be initialized by accessing a setup application on the mobile device 30, and in some implementations, may further include configuring the controller 20 for the setup operation. For example, the controller may be configured in response to a user input for a programming operation configured to receive trailer setup data from the mobile device 30. In some implementations, the mobile device 30 may be configured to connect to the controller 20 prior to the setup operation and receive instructions from the controller 20 to guide some or all steps of the setup process.

The mobile device 30 may also be operable to process setup instructions for the trailer maneuvering system 10 in the form of a trailer setup application stored in the memory of the mobile device 30. Depending on the particular implementation, the mobile device 30 may be connected to or placed in communication with the controller 20 in step 104 or at a later time (e.g. following the completion of the trailer setup as shown in step 122). The connection between the mobile device 30 and the controller 20 may be implemented via the communication circuitry 36 of the controller 20, and the communication circuit 158 and/or the local wireless interface 174. In some implementations, the mobile device 30 may also communicate with the controller 20 via a wire interface (e.g. usb), such that the instructions, trailer profile, and/or trailer setup data may be communicated therebetween. In each of the implementations, the mobile device 30 may continue the setup of the trailer maneuvering system 10 by processing setup instructions received from the controller 20 and/or provided as software steps in the trailer setup application (106). The instructions may then be displayed on the screen 60 of the mobile device 30 (108).

Once the setup process is initiated on the mobile device 30, an option may be presented on the mobile device 30 to proceed in manual entry mode or an express setup mode (110). In the manual entry mode, the mobile device 30 is configured to prompt the operator for trailer dimensions and additional setup information and provide instructions for various steps of the setup process (112). The mobile device 30 is configured to receive an input from the operator corresponding to at least one characteristic of the trailer (114). This process may continue as the operator is instructed and inputs various dimensions and information for the trailer 4 until the trailer 4 is successfully programmed into the controller 20.

In the express setup mode, the mobile device 30 may be configured to capture an image of at least one characteristic of the trailer 4 and/or coded data corresponding to set up information for the trailer 4 (116). The coded data may correspond to any information configured to identify at least one characteristic of the trailer 4. For example, the coded data may include a model number, a symbol, a QR code, a barcode (linear and/or matrix), etc. the mobile device 30 may digitize the image data and identify the trailer dimensions and setup information by utilizing OCR, a decoding algorithm, or any other process configured to extract information from the image (118). In this way, the setup information for the trailer 4 may be identified and communicated to the controller 20 as a trailer profile based on the information extracted from the image. In this way, the disclosure provides for an efficient setup process for the trailer maneuvering system 10.

Once the setup information is processed by the mobile device 30, the method may continue by determining if the trailer setup is complete (120). The trailer setup process may be determined to be completed once all of the necessary trailer dimensions and setup information has been captured. If the trailer setup is not complete, the setup process may continue to step 110 in manual entry mode or express set up mode. If the trailer setup process is determined to be complete, the mobile device 30 is configured to communicate the trailer setup information to the controller 20 and/or store the trailer setup information as a trailer profile in memory (122). Though the trailer setup information is described as being communicated after the trailer setup is complete, portions of the trailer setup information and/or individual dimensions and information may be communicated to the controller 20 periodically throughout the method 100.

Figure 6:
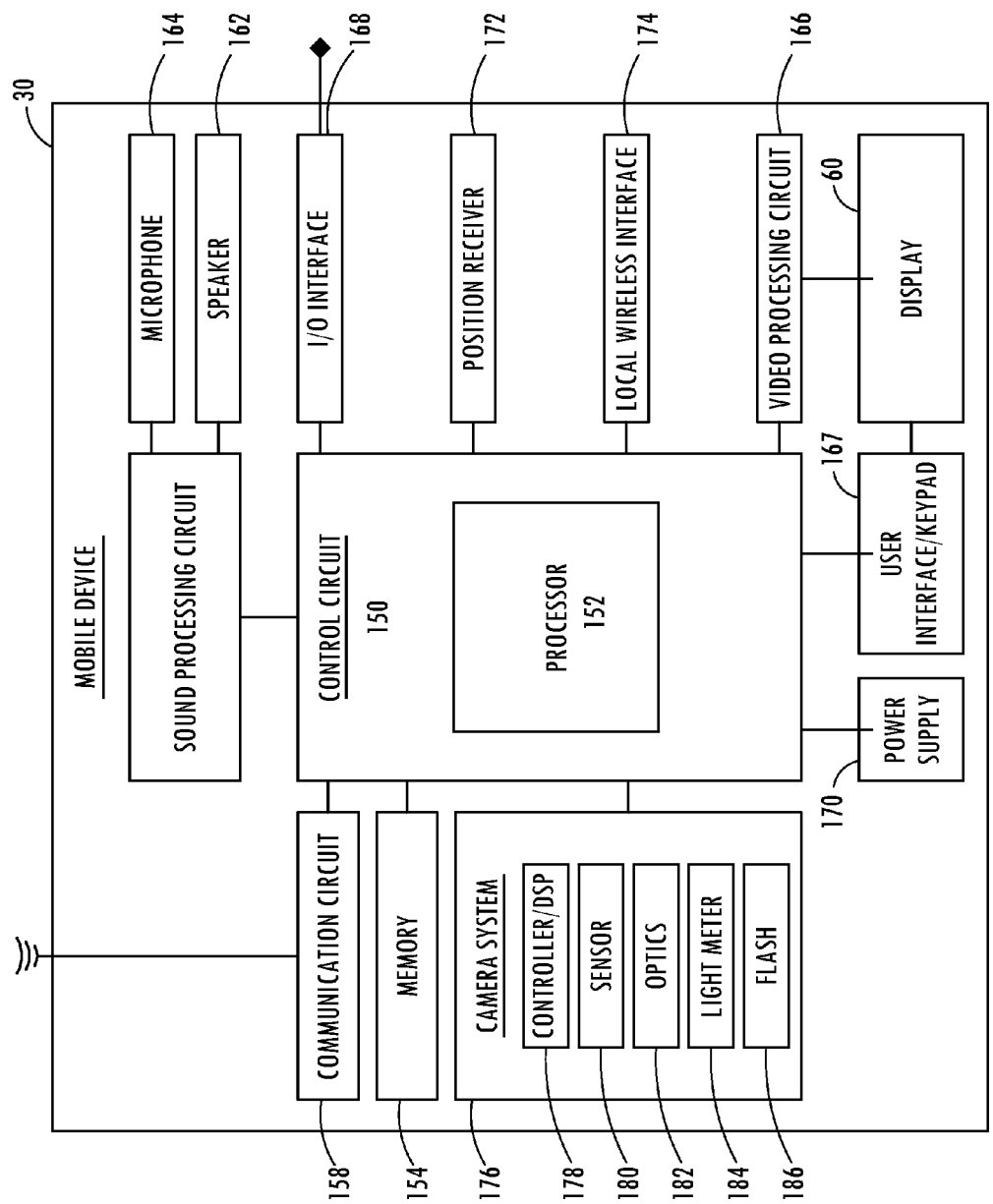
FIG. 6 is a block diagram of a mobile device configured to capture and communicate at least one characteristic of a trailer to setup a trailer maneuvering system in accordance with the disclosure.

FIG. 6 is a block diagram of an exemplary implementation of the mobile device 30. The mobile device 30 includes a primary control circuit 150 that is configured to control the functions and operations of the mobile device 30. The control circuit 150 may include a processor 152, such as a CPU, microcontroller or microprocessor. The processor 152 is configured to execute code stored in an on-board memory (not shown) within the control circuit 150 and/or in a separate memory, such as the memory 154, in order to carry out various operations of the mobile device 30. The memory 154 may be, for example, one or more of a buffer, a flash memory, a hard drive, a removable media, a volatile memory, a non-volatile memory or other suitable devices operable to store data in a non-transitory state.

The mobile device 30 may also include an antenna 156 coupled to a wireless communication circuit 158. The communication circuit 158 includes a radio frequency transmitter and receiver for transmitting and receiving signals via the antenna 156. The radio signals may be configured to transmit data and may correspond to various communications protocols. The communication circuit 158 may be configured to operate in a mobile communications system and may be used to send and receive data and/or audiovisual content. The communication circuit may further be operable to communicate with the controller 20 via various wireless protocols. Receiver types for interaction with a mobile radio network and/or wireless broadcast network may include GSM, CDMA, WCDMA, GPRS, MBMS, WiFi, WiMax, DVB-H, ISDB-T, etc., as well as advanced versions of these standards and protocols that may be developed at a later time.

The mobile device 30 further includes a sound signal processing circuit 160 for processing audio signals transmitted by and received from the communication circuit 158. Coupled to the sound processing circuit 160 are a speaker 162 and a microphone 164 that enable a user to listen and speak via the mobile device 30. The communication circuit 158 and sound processing circuit 160 are each coupled to the control circuit 150 so as to carry out overall operation of the mobile device 30. Audio data may be passed from the control circuit 150 to the sound signal processing circuit 160 for playback to the user. The audio data may include, for example, audio data from an audio file stored in the memory 154 and retrieved by the control circuit 150, or received audio data such as in the form of audio data from a remote server. In some implementations, the audio data may correspond to one or more audio instructions describing at least one step of the trailer setup. The sound processing circuit 160 may include any appropriate buffers, decoders, amplifiers, etc.

The screen 60 may be coupled to the control circuit 150 by a video processing circuit 166 that converts video data to a video signal used to drive the screen 60. The video processing circuit 166 may include any appropriate buffers, decoders, video data processors, etc. The video data may be generated by the control circuit 150, retrieved from a video file that is stored in the memory 154 (e.g. a trailer setup application stored in the memory 154), derived from an incoming video data stream received by the communication circuit 158 from the remote server, or obtained by any other suitable method. The mobile device 30 may further comprise a user interface or keypad 167 in communication with the control circuit 150. The user interface may further function in connection with the screen 60 to provide for a touch screen user interface configuration.

The mobile device 30 may further include one or more I/O interfaces 168. The I/O interfaces 168 may be in the form of typical mobile telephone I/O interfaces and may include one or more electrical connectors. The I/O interfaces 168 may be used to couple the mobile device 30 to a battery charger to charge a battery of a power supply 170 within the mobile device 30. Further, the I/O interfaces 168 may serve to connect the mobile device 30 to the controller 20, a personal computer, or other device via a data cable for the exchange of data. The data exchanged may include image data for identifying at least one characteristic of the trailer 4, a trailer profile, dimensional data corresponding to the trailer 4, and additional setup data. The mobile device 30 may receive operating power via the I/O interfaces 168 when connected to a power adapter.

The control circuit 150 may comprise one or more timers for carrying out timing functions. The mobile device 30 also may include a position data receiver 172, such as a global positioning system (GPS) receiver. The mobile device 30 also may include a local wireless interface 174, such as an infrared transceiver and/or an RF adaptor (e.g., a Bluetooth adapter), for establishing communication with the controller 20 of the vehicle 2, a computer, or any compatible device. For example, the local wireless interface 174 may operably couple the mobile device 30 to the controller 20 to communicate programming and setup information for setup of the trailer 4 for utilization with the trailer maneuvering system 10.

The mobile device 30 may further be coupled to a camera system 176 including a controller 178, such as a digital signal processor (DSP). The functions of the controller 178 may be controlled by the control circuit 150. The camera system 176 may further include a sensor 180 (e.g., a charged-coupled device or CCD) configured to capture an image in a field of view determined by imaging optics 182 of the camera system 176. A light meter 184 may detect illumination conditions in the field of view and a flash 186 may provide supplemental illumination during the capture of image data. The camera system 176 may be configured to capture at least one image corresponding to a characteristic and/or coded data corresponding to setup information for the trailer 4 providing for an improved setup procedure that may improve the ease and accuracy of the setup process for the trailer maneuvering system 10.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read-only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures that may be separately stored and managed, may be incorporated into a single memory or database, may be logically and physically organized in many different ways, and also may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A system for configuring a trailer model for a trailer maneuvering system comprising:
   a controller comprising a memory and in communication with the trailer maneuvering system, wherein the controller is configured to:
      receive trailer dimensional data corresponding to a kinematic model of the trailer from a mobile device;
      store the trailer dimensional data in the memory corresponding to a first trailer profile;
      access the trailer dimensional data; and
      control a path of the trailer based on the dimensional data.

2. The system according to claim 1, wherein the at least one vehicle operation comprises determining a steering angle of the vehicle to control the path of the trailer.

3. The system according to claim 1, wherein the controller is further operable to receive at least one image corresponding to the first trailer profile from the mobile device.

4. The system according to claim 3, wherein the controller is further operable to display the at least one image on a screen of the vehicle to identify a first trailer corresponding to the first trailer profile.

5. The system according to claim 1, wherein the trailer dimensional data is calculated by identifying a first reference point and a second reference point in the image data to calculate a dimension of the kinematic model.

6. The system according to claim 5, wherein the first reference point and the second reference point correspond to features of the trailer identified in the image data.

7. The system according to claim 1, wherein the controller is further operable to detect at least one error corresponding to the trailer maneuvering system and send a corresponding error message to the mobile device.

8. The system according to claim 1, wherein the mobile device comprises one of a tablet, a smartphone, a laptop, a netbook, and mobile gaming device.

9. A system for configuring a model for a trailer comprising:
   a mobile device configured to:
      capture a trailer profile comprising trailer dimensional data corresponding to a kinematic model;
      communicate the trailer profile to a first controller of a first trailer maneuvering system corresponding to a first vehicle; and
      wherein the first controller is operable to access the trailer profile and control a path of the trailer based on the dimensional data.

10. The system according to claim 9, wherein the first trailer maneuvering system utilizes trailer dimensional data of the trailer profile to determine a steering angle of the first vehicle to control a path of the trailer.

11. The system according to claim 9, wherein the mobile device is further operable to display a prompt to request an input and to receive the input defining at least one dimension of the trailer dimensional data.

12. The system according to claim 9, wherein the mobile device is further operable to capture an image of coded data to identify the at least one dimension of the trailer.

13. The system according to claim 12, wherein the coded data comprises a plurality of trailer dimensional data corresponding to a dimensional model of the trailer.

14. The system according to claim 12, wherein the coded data is identified by the mobile device by an optical character recognition process configured to identify the at least one dimension of the trailer.

15. The system according to claim 9, wherein the mobile device is further operable to store the trailer profile and communicate the trailer profile to a second controller in communication with a second trailer maneuvering system of a second vehicle.

16. A method for configuring a trailer model on a mobile device in connection with a trailer maneuvering system:

displaying a prompt to request a setup instruction, wherein the setup instruction is configured to identify at least one characteristic corresponding to a trailer;

receiving an input corresponding to the at least one characteristic of the trailer;

communicating the at least one characteristic to the trailer maneuvering system, wherein the, trailer maneuvering system utilizes the at least one characteristic to control a path of the trailer.

17. The method according to claim 16, wherein the data is calculated from at least one dimension corresponding to alternate dimensional data.

18. The method according to claim 16, further comprising capturing an image of coded data to identify the at least one characteristic, wherein the at least one characteristic corresponds to a kinematic model of the trailer.

19. The method according to claim 16, further comprising capturing an image of the trailer comprising a first reference point and a second reference point corresponding to a dimension of a kinematic model of the trailer.

20. The method according to claim 19, further comprising comparing the at least one identifiable feature with the dimension to determine a measurement of the dimension.

* * * * *